United States Patent [19]

Weaver et al.

[11] 4,052,108
[45] Oct. 4, 1977

[54] FILLING SYSTEM FOR A SILO

[76] Inventors: Richard L. Weaver, R.D. No. 1, Myerstown, Pa. 17067; John Stoltzfus, 543 Strasburg Pike, Lancaster, Pa. 17602; Henry Stoltzfus, 618 Donegal Spring Road, Mount Joy, Pa. 17552

[21] Appl. No.: 621,154

[22] Filed: Oct. 9, 1975

[51] Int. Cl.² .......................................... B65G 53/40
[52] U.S. Cl. ................................. 302/60; 214/17 C
[58] Field of Search ................ 52/192; 141/1, 5, 59, 141/67, 285, 286, 289, 302, 306, 325, 326, 392; 214/17 C, 17 CB; 302/34, 60, 61

[56] References Cited

U.S. PATENT DOCUMENTS

| 2,838,076 | 6/1958 | Knight et al. | 141/286 X |
| 3,459,457 | 8/1969 | Weaver et al. | 302/60 |
| 3,868,149 | 2/1975 | Weaver et al. | 302/60 |

Primary Examiner—Richard E. Aegerter
Assistant Examiner—Frederick R. Schmidt
Attorney, Agent, or Firm—Paul & Paul

[57] ABSTRACT

A filling system for a silo is provided, wherein the silo is filled by blowing grain, hay, or other suitable material into the silo through a duct that extends up the silo wall, and that turns and enters into an inlet opening at the top of the silo wall, whereupon the fill material is blown toward the geometric center of the silo at the top thereof, to strike a baffle or deflector, whereupon the fill material may fall from the upper center of the silo toward the bottom thereof. A pressure relief system is provided in the form of a vent that also has a baffle or deflector for engagement of large dust particles thereagainst, and in addition is provided with a screen-type collector, with an open hole for assurance that the vent will not become blocked. Particularly novel opening mechanisms are provided for the fill door and the vent door, for opening them by an operator located at the ground level. A novel opening is provided for an access door above the center deflector or baffle. The fill material may be provided to the silo using reduced energy requirement for delivery of the fill material, and without requiring climbing by an operator to the roof or top of the silo.

19 Claims, 10 Drawing Figures

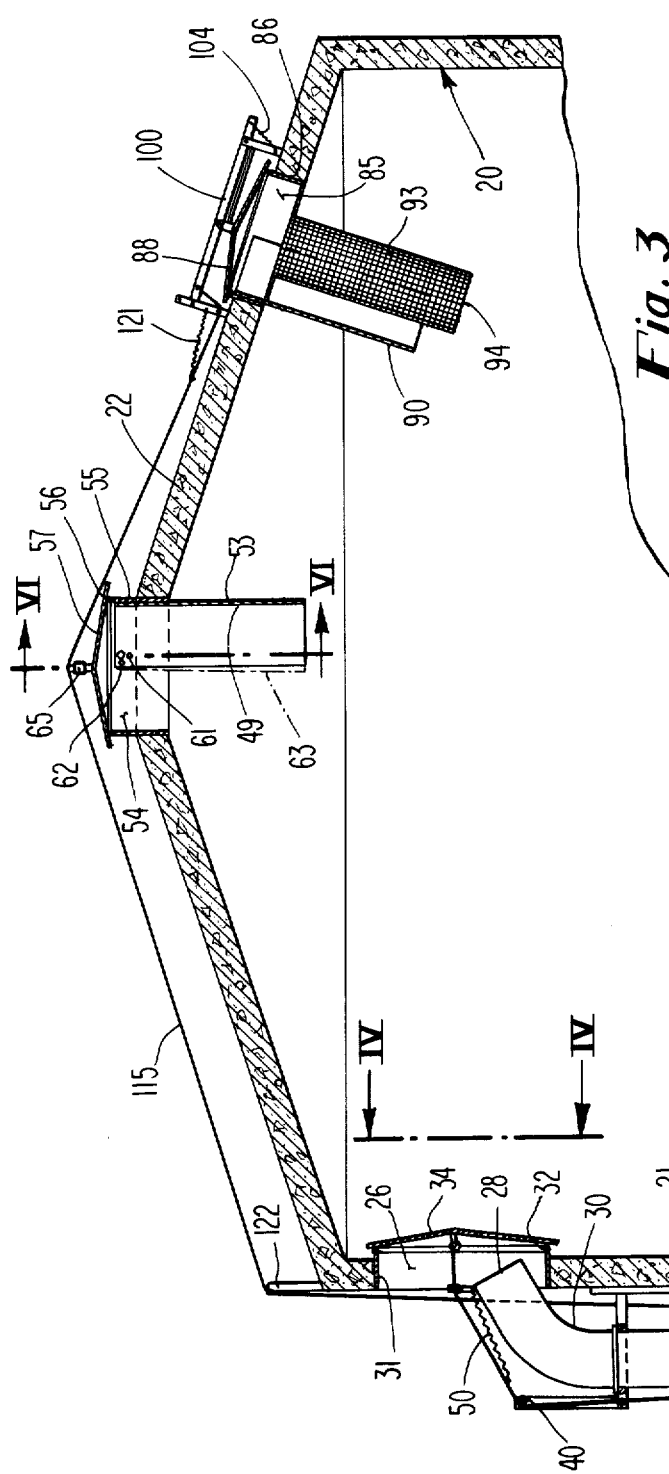
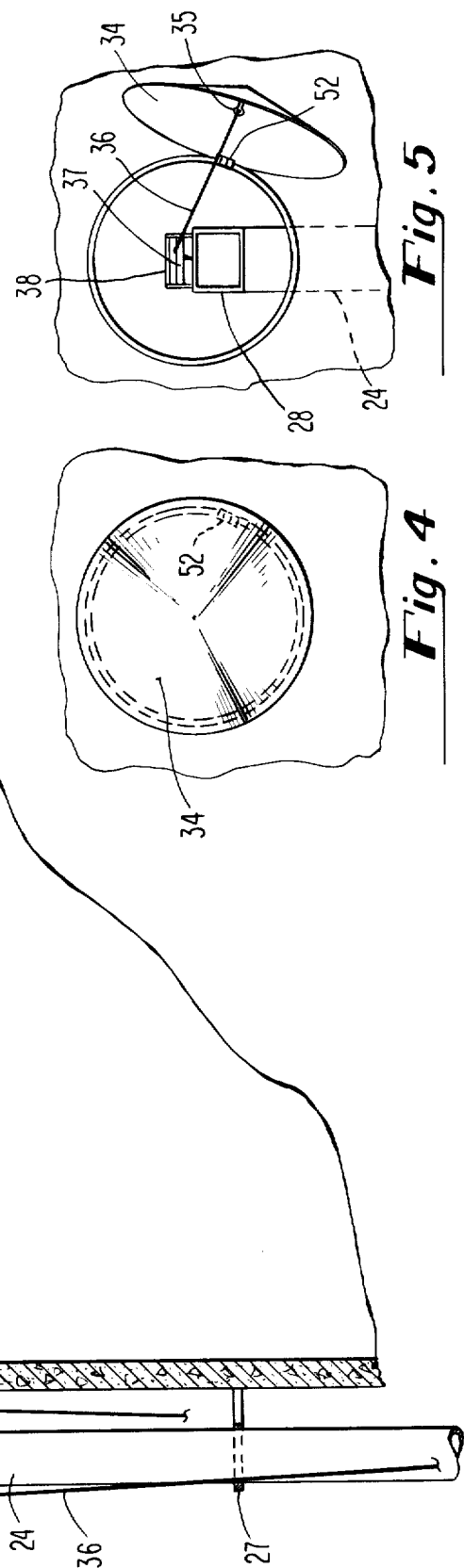

FILLING SYSTEM FOR A SILO

BACKGROUND OF THE INVENTION

In silos of prior art types, it has become commonplace to provide a blower-type fill mechanism for introducing fill material such as hay, corn, etc. into the silo. Such mechanisms have generally involved use of a large duct, that passes up along a silo wall, making a large arc across the top of the silo, and then generally radially inwardly to a centrally disposed fill location in the top or roof of the silo. Because of the necessity of making the equivalent of two full 90 degree bends, or in any event such that the fill material undergoes a complete 180 degree turn during its filling, substantial energy is required to blow the fill material into the silo. These same types of prior art devices also lend themselves to clogging, because of the number of turns and the distance of conveyance within a duct that is required. Not only are there generally a great number of instances of clogging, but great difficulty can be experienced in relieving the clogging. It may be necessary to send personnel up to the roof of the silo to disconnect the duct work, in order to relieve the clogging. Also, opening and closing of inlet openings for the fill from the roof of the silo is generally required and such use as requires the presence of personnel on the roof of the silo, thereby posing a potentially dangerous condition that can sometimes lead to falling of personnel from the top of a silo.

THE PRESENT INVENTION

The present invention is directed toward eliminating the necessity of personnel going to the roof of a silo during its normal use, and also is directed to solving the problems discussed above with respect to prior art types of silos; for example, to greatly reducing the energy requirements for blowing fill material into a silo, for greatly reducing the likely instances of clogging, and for greatly reducing construction costs for example, in reducing the amount of duct material involved, as well as for providing a system whereby a silo may quickly and efficiently be provided with fill material. To this end, an important part of the present invention resides in the vent mechanism whereby pressure is relieved from the silo as material is being injected thereinto, but which relief is specifically designed to avoid dissemination of dust and particles of like fill material into the air from outside the silo, to the extent possible.

Accordingly, it is a primary object of this invention to provide a novel filling system for a silo.

It is another object of this invention to provide a novel vent system for effecting a pressure relief of a silo.

It is a further object of this invention to provide a novel silo fill arrangement wherein a silo is to be filled by means of an air-delivering delivery duct.

It is a further object of this invention to provide a novel deflector or baffle mechanism for placement of fill material in a silo at the desired locations.

Other objects and advantages of the present invention will be readily apparent to those skilled in the art from a reading of the following brief descriptions of the drawing figures, detailed descriptions of the preferred embodiments, and the appended claims.

BRIEF DESCRIPTIONS OF THE DRAWING FIGURES

FIG. 3 is an enlarged fragmentary vertical sectional view taken through the silo of FIG. 1, generally along the line III—III of FIG. 1.

FIG. 4 is an enlarged fragmentary view of the fill door for the silo of FIG. 3, taken generally along the line IV—IV of FIG. 3, with the door being illustrated in its closed position.

FIG. 5 is a view similar to that of FIG. 4, but with the door being illustrated in its open position.

DETAILED DESCRIPTIONS OF THE PREFERRED EMBODIMENTS

Figure 1:
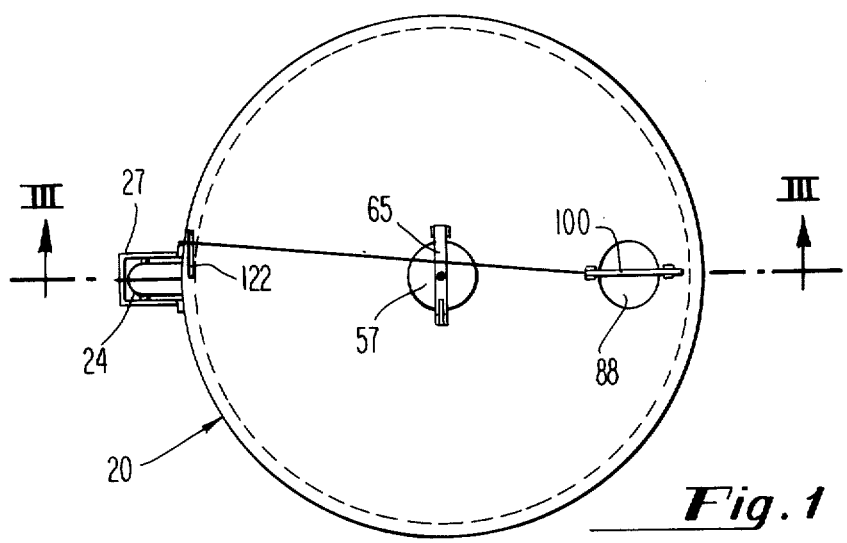
FIG. 1 is a top plan view of a silo in accordance with the present invention.
Figure 2:
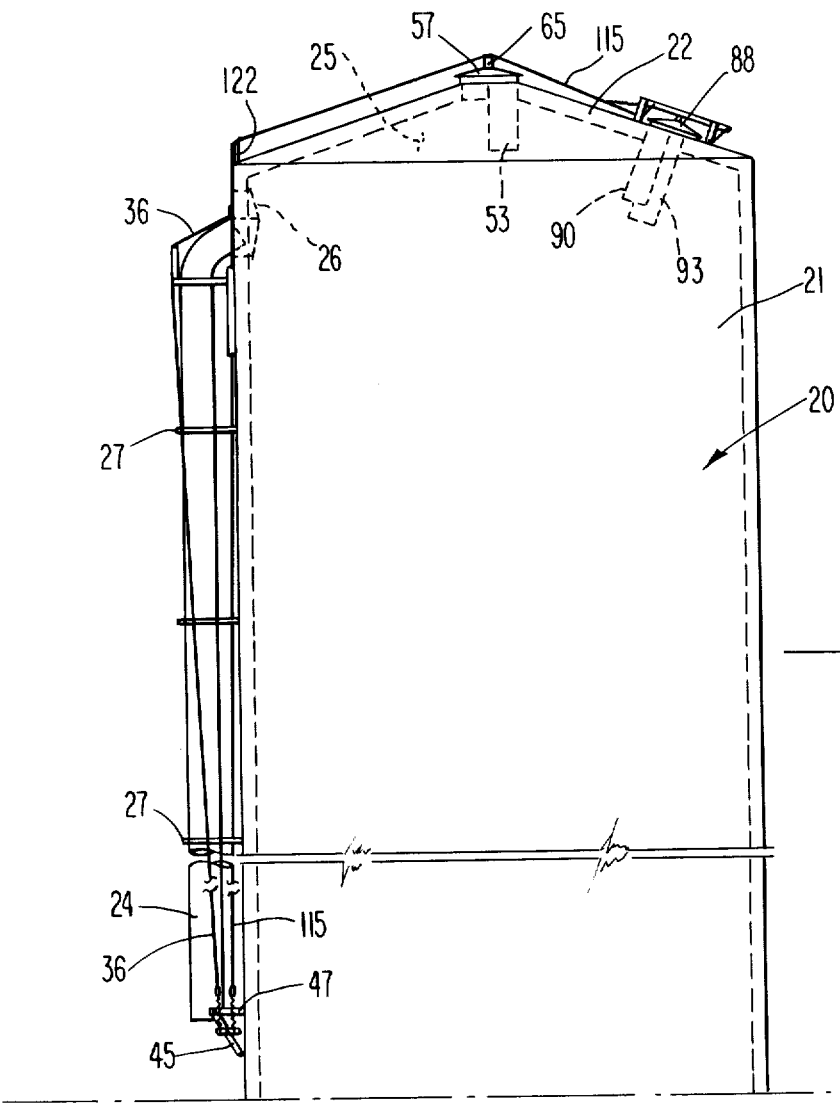
FIG. 2 is a front elevational view of a silo of the type illustrated in FIG. 1, but which is illustrated as being vertically foreshortened, for facilitating the illustration thereof.

Referring now to the drawings in detail, reference is first made to FIG. 1, wherein there is illustrated a silo 20 for containing customary silage-making materials, such as hay, oats, etc., for storing the same therein. The silo 20 will preferably be of concrete construction, and will also preferably have a cylindrical sidewall 21 and a top wall 22 sloped downwardly from a central portion toward the wall 21, as illustrated in FIG. 2, to be generally frusto-conically configured. The top wall 22 will also preferably be of poured concrete construction. The silo 20 will generally be disposed upon the ground 23, or a concrete pad or the like, as desired. Suitable fencing or protective bars will normally be provided around the outer periphery of the top wall 22 of the silo 20, although the same are not illustrated herein, for purposes of clarity.

The silo 20 is normally filled by blowing the fill material by means of a powerful blower or the like, or by any other suitable means, through a duct 24, whereby the fill material may be transported from a lower outside region of the silo 20, up through the duct 24, and into the upper interior 25 of the silo 20 through a fill inlet opening 26.

The duct 24 is normally secured to the exterior of the silo wall 21 by means of supporting clamps, brackets or the like 27. The duct 24 has a discharge end 28 as illustrated in FIG. 3 that is disposed at an acute angle with the flow of fill material through the duct 24 through the principal zone of material delivery by the duct 24. The duct discharge or outlet opening ends just beyond a gradually curved portion 30, the curve being gradual in order to minimize opportunities for fill material to clog the duct 24.

Figure 7:
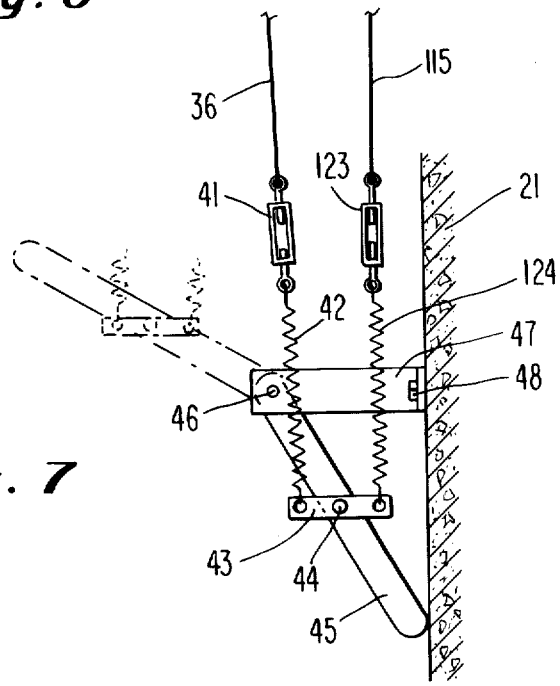
FIG. 7 is an enlarged fragmentary side elevational view of the device for remote operation of the opening and closing of the fill and vent opening doors, with an over-center handle device thereof being illustrated in both full line and fantom positions.

The fill opening 26 comprises a generally circular hole in the sidewall 21 of the silo 20, with a cylindrical metal sleeve 31 securely anchored therein, and with an inner portion of the sleeve 31 having a suitable preferably rubber sealing bead 32 secured therein by suitable means. A closure door 34 is provided, normally closed against access to the outside of the silo except when it is desired to introduce fill material into the silo, at the upper end thereof. The door 34 is of conical configuration as illustrated in FIGS. 3 through 5, but is resiliently deformable, and preferably of resilient plastic construction, so that it can be pulled tightly toward the circular bead 32, and will conform thereagainst, in order to effect a tight seal therewith. A connector member 35 is connected to the inside of the door 34 by any suitable means, and has a cable-like tension member (preferably a metal cable) 36 secured thereto, which cable 36 also passes over a suitable roller or slide bar (as desired) 37 that forms the lower bar of a rectangular guide 38 as illustrated in FIG. 5, with the guide 38 being carried by an upper portion of the duct opening 28, as illustrated in FIGS. 3 and 5. The cable 36 then passes around another guide bar 40 (see FIG. 3) and downwardly alongside the duct 24 to about ground level where it is connected to a suitable tightener 41 that in turn is connected to a spring 42 of the extension spring type, with the other end of the spring 42 being connected to a bar 43 that is pivotally mounted at 44 for free pivotal movement of the bar 43 relative to a handle-type latching member 45. The member 45 is pivotally mounted at 46 on a supporting bar 47 that in turn is bolt-mounted or otherwise suitably secured at 48 to the exterior of the silo wall 21. It is thus seen that the bar 45 is of the over-center operative type between the full line and fantom positions illustrated therefor in FIG. 7, for securely spring-biasing the door 34 tightly against the bead 32, with the handle 45 in the full line position illustrated in FIG. 7, and with facility being provided for releasing the door 34 upon movement of the handle 45 to the fantom position illustrated in FIG. 7. When the handle 45 is released to the fantom position illustrated in FIG. 7, another extension spring 50 (FIG. 3) exerts an outwardly lifting force or tension upon the cable 36, in order to offset to some degree the weight of the cable 36, and so that the door 34 will be free to fall inwardly as illustrated in FIG. 5, under the force of gravity, with the door 34 pivoting on a hinge 52 as indicated in FIG. 5. It will be noted that the door 34 is relatively free to fall inwardly once the handle 45 has been moved to its fantom position illustrated in FIG. 7, due to the lifting forces provided by the spring 50.

Figure 6:
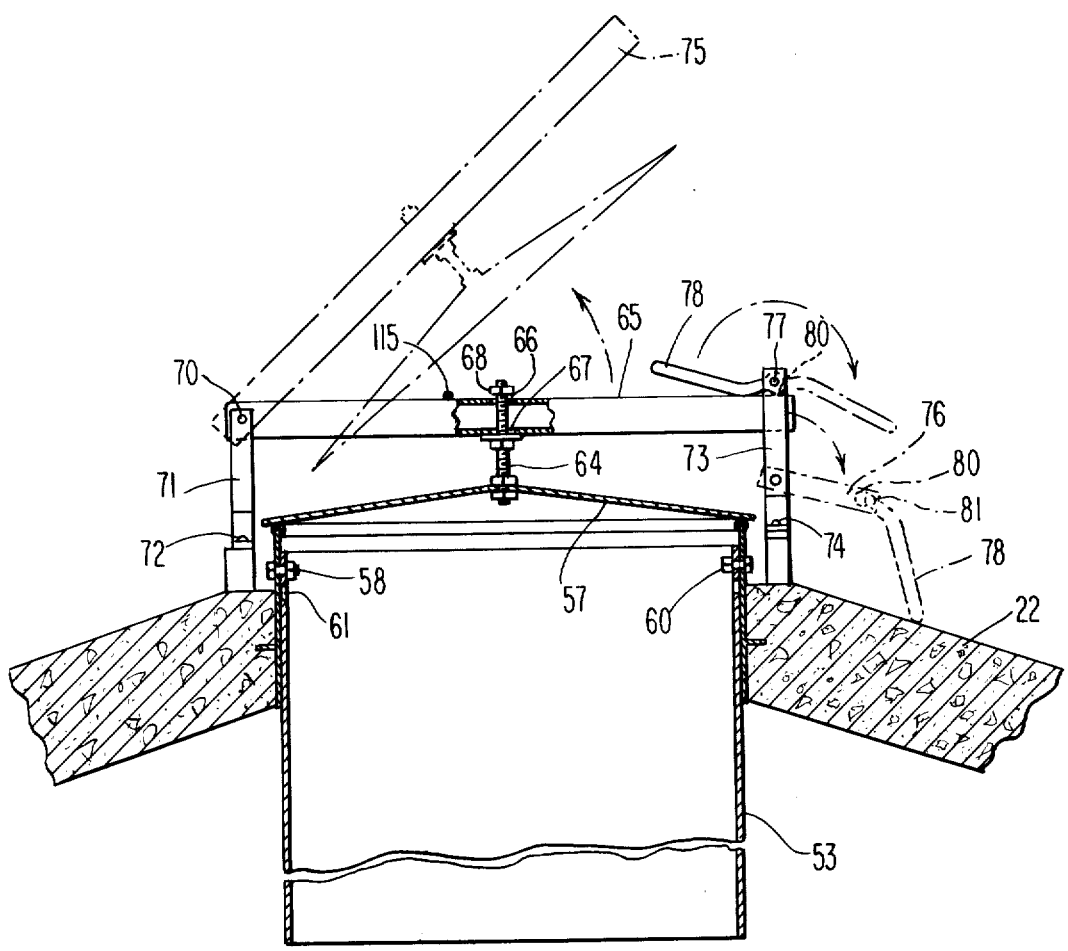
FIG. 6 is an enlarged fragmentary vertical sectional view taken through the center baffle and access closure in accordance with this invention, with the closure, its supporting member and the lock mechanism being illustrated in both full line and fantom positions corresponding to the closed and opened positions of the closure, respectively.

With reference now to FIGS. 1, 2, 3 and 6, it will be noted that a baffle or deflector means 53 is provided at an upper central location within the silo 20, with the deflector being disposed to be contacted by fill material being delivered through the fill opening 26 by the duct 24, such that the fill material will be shot from the duct opening 28 against the deflector means 53. The deflector means 53 will generally be of semi-cylindrical or semi-sleeve-like construction as illustrated in FIGS. 3 and 6 specifically.

At the top of the silo lid 22, and generally centrally thereof, there is provided an access opening 54 that comprises a hole in the concrete, with a metal sleeve 55 suitably carried therein, with the sleeve terminating at its upper end in a sealing bead 56, for tight sealing of an access door 57 thereagainst. The access door 57 is generally constructed similar to the door 34 to be resiliently deformable under applied pressure, as discussed above.

Opening of the door 57 provides access to the baffle or deflector 53 for purposes of adjustment of the deflector 53, either vertically or angularly, by means of removing and re-connecting bolts 58, 60 in a plurality of holes such as that 61 in the baffle member 53. Thus, the member 53 may be adjusted vertically as desired, or angularly by placing the bolts 58 or 60 in laterally adjacent holes 62, for example, such that the deflector member 53 would assume the fantom line position 63 illustrated in FIG. 3.

The access closure 57 is carried on a threaded member 64 that in turn, is carried by a supporting bar 65, in a loose carrying arrangement provided by oversized holes 66 and 67 in the bar 65, whereby the threaded member 64 cannot fall therefrom by means of a nut 68, but whereby a certain amount of freedom of adjustment is provided in re-seating the access closure door 57 after it has been opened. The bar 65 is pivotally moveable about pivot 70 between the full line and fantom positions illustrated in FIG. 6. The pivot 70 in turn, is carried by suitable supporting members 71 rigidly affixed at 72 to the top wall 22 of the silo. A pair of vertical members 73 are also mounted at 74 to the top of the silo 22 as illustrated, with the members 73 having a space therebetween (not shown) for receipt of the locking end 75 of the bar therebetween when an upwardly pivotal portion 76 of the bars 73 are moved from the fantom line position illustrated therefor in FIG. 6, to the full line positions illustrated therefor, whereupon a pivot point 77 is disposed over the end 75 of the bar 65, and whereupon a handle 78 that extends between the parallel bar portions 76 may be grasped and moved from the fantom position illustrated in FIG. 6 to the full line position, whereby an over-center lock member 80 locks the bar 65 in place as the handle member 78 is pivoted about its pivot point 81.

A pressure relief system is provided for the silo 20, so that as fill material is being introduced into the silo, and taking up volume therein, room may be allowed by passage of air that previously occupied such volume, outwardly of the silo. Consequently, during filling of the silo, with a great amount of fill material and the air that carries it into the silo being injected into the silo, it is necessary to provide a mechanism for rapid release of air, or venting from the silo. This also effects a pressure release for the silo that becomes another safety consideration. To this end, a vent opening 85 is provided in the top wall of the silo, substantially as illustrated, with a suitable metal sleeve 86 or the like being anchored or otherwise suitably secured in a hole in the silo top wall 22, and with the sleeve 86 being provided with a sealing bead 87 at its outer end, for tight sealing of a vent closure door 88 thereagainst. The door 88 is constructed similar to the construction of the fill door and the access door, except for its mounting. Within the opening 85, and depending downwardly therefrom into the silo, there is provided a deflector or baffle 90, that is also semi-cylindrical, or semi-sleeve-like, and which has its convex-like surface 91 facing toward the deflector 53. The deflector 53 has its concave surface 49 facing toward the fill inlet 26, for reasons that will be apparent in "catching" fill material for dropping the same downwardly from a central upper location, whereas the dust or other fill material (usually larger particles) that would strike the deflector 91 would preferably be bounced thereoff, and dispersed rather widely and randomly about the interior of the silo, rather than piling up beneath the vent opening 85.

The baffle or deflector 90 may be permanently welded or otherwise suitably secured (or even adjustably secured if desired) to the sleeve 86, as at 92, as desired.

Figure 8:
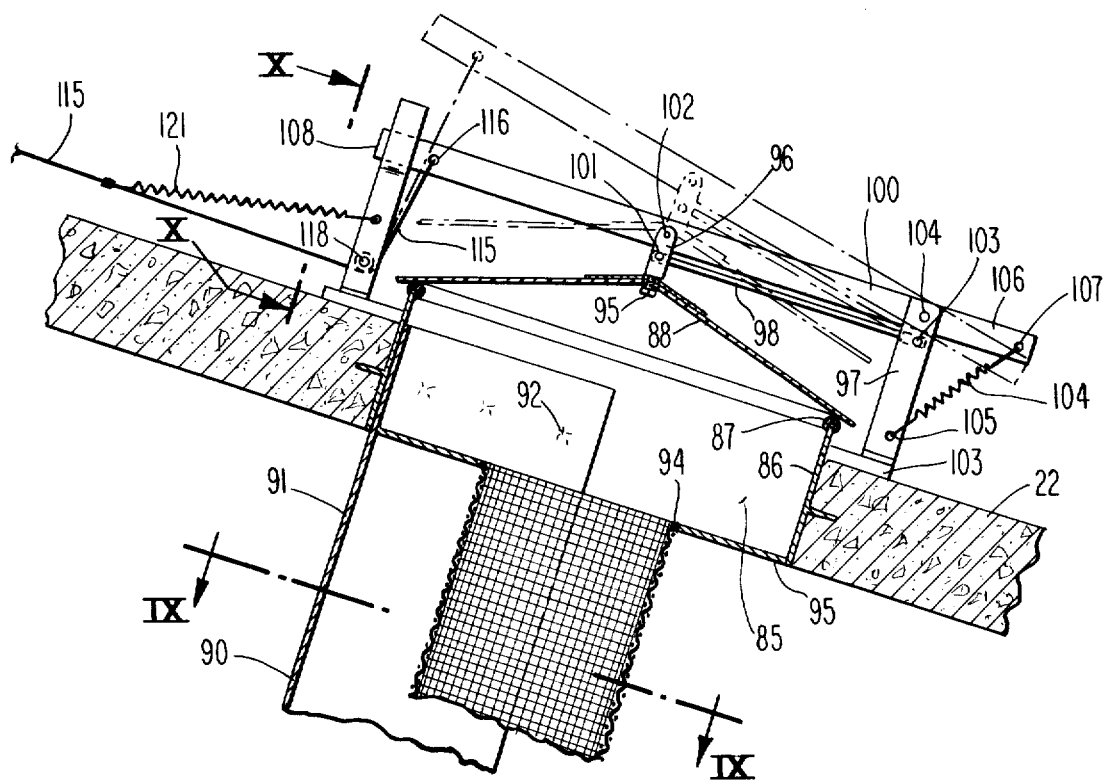
FIG. 8 is an enlarged fragmentary vertical sectional view, taken through the vent opening and closure door of FIG. 1, generally along the same line as section III-—III of FIG. 1, and wherein the closed and opened positions of the vent door are illustrated in full lines and fantom positions respectively.
Figure 9:
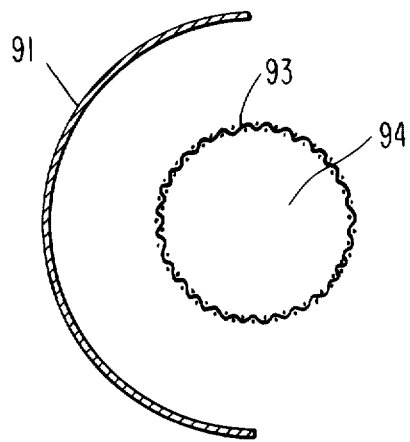
FIG. 9 is a transverse sectional view taken through the vent baffle and screen of this invention, taken generally along the line IX—IX of FIG. 8.
Figure 10:
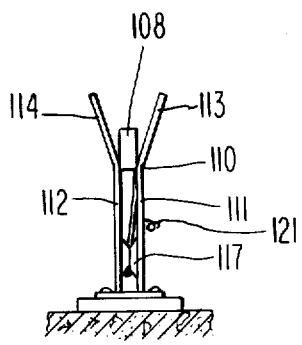
FIG. 10 is an elevational view of the guide for the vent door support, with the view being taken generally along the line X—X of FIG. 8.

A dust collector screen 93 is provided, mounted to communicate with a circular hole 94 in a flat plate annulus 95 located at the bottom of the sleeve 86 as indicated in FIG. 8, such that passage through the vent opening 85 of air and dust materials will be through the screen 93, or through the circular unscreened opening 94 at the bottom thereof. The screen traps and collects larger particles, and thereby acts as a deflector or baffle for such particles. However, the bottom 94 is kept open and unscreened, because on occasion, large amounts of fill material may be injected into the silo 20 in a "spurt" that may result in a "spurt" of air discharge that may carry many particles at once, toward the screen 93.

With the screen 93 open at the bottom 94, in the event that there occurs even an instant in which the screen 93 has its pores clogged with material, venting can still occur through the bottom 94 thereof.

It has been found that, on occasion, the filling is somewhat cyclic, and the vibration from filling causes cyclic intervals that in effect vibrate fill material that does clog the pores of the screen 93, off of the screen, to unclog the pores. However, in any event, it will be apparent from the foregoing that some access is provided for venting even if the screen 93 has its peripheral surface blocked.

The closure door 88, like the other doors in accordance with this disclosure, is resiliently flexible for sealing purposes, and preferably of plastic construction. A bolt 95 mounts the door 88 to a link member 96. The link member 96, together with upstanding support 97, tie rod 98 and main vent opening bar 100 form a parallel linkage about pivots 101, 102, 103, and 104, with the bar 100 pivoting about the point 104, and with the link 98 moving parallel therewith as is illustrated in the respective positions of full line illustration and fantom illustration of FIG. 8. By such movement, the door 88 moves upwardly as indicated by the fantom position therefor indicated in FIG. 8, maintaining its same angularly orientation relative to the structure of the vent opening 85. The support 97 is mounted in some suitable way to a footing 103 that in turn is carried by the top 22 of the silo 20, and a tension or extension spring 104 is connected to the support 97 at 105, and also to an extension lever portion 106 of the main bar 100, at 107, for providing a lifting force for lifting the bar 100 and the door 88, so that the door is lifted to the fantom position illustrated in FIG. 8, when the leftward end of the bar 100 as viewed in FIG. 8 is allowed to rise from the full line position thereof illustrated in FIG. 8, to the fantom position so illustrated. In the closed position of the door 88, the leftward end 108 of the bar 100 is seated at 110 between upstanding support members 111 and 112, at the upper end of said support members 111 and 112, where such support members join outwardly flared guide portions 113 and 114 respectively. It will apparent that as the bar 100 is moved upwardly and downwardly, the flared portions 113 and 114 will facilitate seating of the end 108 of the bar 100 therein, so that the door 88 carried by the bar 100 will always seat at the same position of the door 88 relative to the bead 87.

The end 108 of the bar 100 is provided with a cable-like tension means, preferably of the cable type 115, connected to the bar 100 at 116, and passing downwardly as viewed in FIG. 8, around a pulley 117 rotatably carried at 118 between the upstanding support members 111 and 112, with the cable 115 being provided with an extension or tension spring 121 for urging the cable 115 to an upper position of the bar 100, such that the lifting of the door 88 is facilitated by the spring 121, as it is facilitated by the spring 104. The cable 115 passes over the bar 65 illustrated in FIG. 6, and across the roof or top wall 22 of the silo 20, around a guide 122 as illustrated in FIGS. 1 and 3, and down the side of the silo as illustrated in FIG. 2, to be connected to a turnbuckle or other suitable adjustment device 123, that in turn is connected by a spring of the extension type 124 to the link 43.

It will thus be apparent that actuation of the handle 45 not only controls the opening of the fill inlet door 34 as aforesaid, but simultaneously releases the downward-holding-tension forces that keep the bar 100 in the full line position illustrated in FIG. 8 with the door 88 closed, to allow the springs 104 and 121 to lift the bar 100 and, consequently, lift the door 88 to open the vent opening 85 to atmosphere, at the same time that the fill door is opened, and simultaneously therewith. It will therefore be seen that cumbersome procedures requiring personnel to climb a ladder to the roof of a silo for opening hatches, doorways, and the like, for adjusting inlet fill spouts and the like are obviated, as are complex turns of the duct work that would normally deliver fill to the central portion of the lid for downward inlet of fill material into a silo also avoided, it being further understood that a simple and singular movement of the handle 45 can open the fill door and the vent simultaneously. It then remains merely to actuate a blower or the like that provides the impelling means for delivering fill material through the duct 24 to the inside of a silo 20.

It will be apparent from the foregoing that various modifications may be made in the details of construction, as well as in the use and operation of the device of the present invention, all within the spirit and scope of the invention as described herein and as included in the appended claims.

What is claimed is:

1. A filling system for a silo, wherein the silo is of the type having side and top walls, said filling system comprising:
   a. a fill opening located at an upper end of a sidewall and communicating with the interior of the silo,
   b. a normally closed openable fill opening closure operably associated with the fill opening,
   c. a delivery duct disposed outwardly of the silo and extending therealong for delivery of fill material to said fill opening,
   d. deflector means mounted inside the silo at a generally central location at an upper portion thereof,
   e. vent means for releaving gaseous pressure in the silo during the filling thereof, the vent means consisting of a vent opening in an upper portion of said silo and a baffle-type deflector for deflecting dust particles away from said vent opening, f. a normally closed openable vent closure operably associated with the vent opening, g. means operably associated with both said fill opening closure and said vent opening closure for simultaneous remote opening of both said fill opening closure and said vent opening closure from a location at the bottom of the silo outside thereof, the remote means comprising, 1. a cable-like tension means having spring assist means operably associated with both said fill opening closure and said vent opening closure to facilitale opening of said fill opening closure and said vent opening closure against gravity forces induced by said tension means and that would otherwise urge said closures toward a closed position, and 2. spring-biased latch means mounted at a location at the bottom of the silo outside thereof and operably associated with said cable-like tension means for controlling the tension in said cable-like tension means thereby simultaneously controlling the operation of both said fill opening closure and said vent opening closure.

2. The filling system of claim 1 wherein said cable-like tension means comprises a first cable-like tension means having one end operably connected to said fill opening closure and another end interconnected to said latch means and a second cable-like tension means having one end operably connected to said vent opening closure and another end interconnected to said latch means.

3. The filling system of claim 2 wherein said vent opening closure comprises a vent door supported by a parallel linkage means, the linkage means being operably associated with both said vent door and said second cable-like tension means for facilitating opening of said vent door while maintaining the same relative orientation of the vent door relative to said vent opening in both open and closed positions of said vent door.

4. The filling system of claim 3, wherein said vent door is constructed to be sufficiently resiliently flexible to facilitate being urged into tight sealing engagement across said vent opening.

5. The filling system of claim 3, wherein spring assist means are provided in engagement with said linkage means for assisting the opening of said vent door.

6. The filling system of claim 3, wherein said parallel linkage means includes a pivotally mounted main bar and a pivotally mounted tie rod, said main bar extending generally transverse of said vent opening, and with guide means at main bar being carried by the silo, said guide means having a funnel-like inlet guide opening for receiving an end of said main bar upon closing of said vent door.

7. The filling system of claim 1, wherein said fill opening closure comprises a hinged fill door mounted inside the silo for pivotal, gravity-induced movement therein upon actuation of said latch means, whereby said door is released to fall away to a position inside the silo wall, uncovering said fill opening.

8. The filling system of claim 7, wherein said fill door is constructed to be sufficiently resiliently flexible to facilitate being urged into tight sealing engagement across said fill opening.

9. The filling system of claim 1, wherein said deflector means is carried by the top wall of said silo.

10. The filling system of claim 9, wherein said delivery duct has an outlet opening that is upwardly angled to eject fill material in an upward direction toward said deflector means.

11. The filling system of claim 10, including access opening means comprising means for opening a normally closed openable access closure door at the general center of said silo top wall for facilitating access to the silo thereto.

12. The filling system of claim 11, wherein said access door includes deformable means for facilitating a sealing of said access door across said access opening means, said access door being non-rigidly carried by a generally transverse bar pivotally mounted for movement of said access door and bar away from said opening, and with over-center means being provided for engagement with said bar for tightly locking said access door in a closed position thereof.

13. The filling system of claim 11, wherein said deflector means is provided with adjustable mounting means for adjusting the angular deflection provided thereby, wherein said access means comprises a generally cylindrical opening member to which said deflector means is mounted.

14. The filling system of claim 10, wherein said deflector means is provided with adjustable mounting means for adjusting the angular deflection provided thereby.

15. The filling system of claim 10, including access opening means comprising means for opening a normally closed openable access closure door at the general center of said silo top wall for facilitating access to the silo therethrough, wherein said deflector means is provided with adjustable mounting means for adjusting the angular deflection provided thereby, wherein said access means comprises a generally cylindrical opening member to which said deflector means is mounted, wherein said deflector means is of a generally semi-cylindrical configuration, a concave portion of which faces in the direction of said delivery duct outlet opening.

16. The filling system of claim 1, wherein said baffle-type deflector is of generally semi-cylindrical construction convexly facing toward said centrally located deflector means.

17. The filling system of claim 16, wherein a dust collector of the screen type is provided at said vent opening for catching larger dust particles at said vent opening.

18. The filling system of claim 1, wherein a dust collector of the screen type is provided at said vent opening for catching larger dust particles at said vent opening.

19. The filling system of claim 18, wherein the dust collector is of generally cylindrical construction having an open non-screened bottom.

* * * * *